United States Patent
Tsukao

(10) Patent No.: US 6,717,648 B2
(45) Date of Patent: Apr. 6, 2004

(54) DEFECT CORRECTING METHOD FOR LIQUID CRYSTAL PANEL

(75) Inventor: Kouji Tsukao, Yonago (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 265 days.

(21) Appl. No.: 09/781,620

(22) Filed: Feb. 12, 2001

(65) Prior Publication Data

US 2001/0050730 A1 Dec. 13, 2001

(30) Foreign Application Priority Data

Jun. 9, 2000 (JP) .................... 2000-173763

(51) Int. Cl.⁷ ........................... G02F 1/13
(52) U.S. Cl. ............................... 349/192
(58) Field of Search ................. 349/54, 55, 192, 349/144; 324/770

(56) References Cited

U.S. PATENT DOCUMENTS

| | | | | |
|---|---|---|---|---|
| 5,132,819 A | * | 7/1992 | Noriyama et al. | 349/55 |
| 5,151,807 A | * | 9/1992 | Katayama et al. | 349/55 |
| 5,335,102 A | * | 8/1994 | Kanemori et al. | 349/55 |
| 5,668,650 A | * | 9/1997 | Mori et al. | 349/42 |

FOREIGN PATENT DOCUMENTS

| | | |
|---|---|---|
| JP | 05002184 A | 1/1993 |
| JP | 05002188 A | 1/1993 |
| JP | 05005902 A | 1/1993 |
| JP | 09127479 A | 5/1997 |

* cited by examiner

Primary Examiner—Tarifur R. Chowdhury
Assistant Examiner—Richard Kim
(74) Attorney, Agent, or Firm—Greer, Burns & Crain, Ltd.

(57) ABSTRACT

A defect correcting method for a liquid crystal panel is disclosed, comprising the step of, when a plurality of pixels are connected, cutting off pixel electrodes of other pixels from a signal supply line in such a way as to drive the other pixels by a TFT of a pixel having a color filter of a highest light transmittance among the plurality of pixels. Another defect correcting method for a liquid crystal panel is disclosed, the liquid crystal panel including a correcting wiring formed beforehand to connect pixels adjacent to each other, comprising the step of: when a defective pixel occurs, electrically connecting a pixel electrode of the defective pixel to that of a pixel adjacent to the defective pixel.

2 Claims, 7 Drawing Sheets

DEFECT CORRECTING METHOD FOR LIQUID CRYSTAL PANEL

BACKGROUND OF THE INVENTION

1. Field of the Invention

The present invention relates to a defect correcting method for a liquid crystal panel, which is designed to correct a defect occurring in a manufacturing process of a liquid crystal panel.

2. Description of the Prior Art

Nowadays, the use of a liquid crystal panel is not limited to a display of a portable computer, but has become widespread to various electronic devices including the display of a desktop computer, a television set, the display of a portable terminal, and so on.

A typical Twisted Nematic (TN) liquid crystal panel has a structure where liquid crystal is sealed in between two transparent substrates. On one of the two opposing surfaces of the transparent substrates, a common electrode, color filters, an alignment film and the like are formed. On the other surface, Thin Film Transistors (TFTs), pixel electrodes, an alignment film and the like are formed. Also, polarizing plates are respectively stuck to surfaces opposite the opposing surfaces of the transparent substrates. These two polarizing plates are disposed, for example, so that polarization axes thereof can intersect perpendicularly to each other. When no voltages are applied between the pixel electrode and the common electrode, a light is transmitted to make displaying bright. When a voltage is applied therebetween, a light is shielded to make the displaying dark. When the polarization axes of the two polarizing plates are disposed in parallel to each other, the displaying becomes dark with no voltages applied between the pixel electrode and the common electrode. The displaying becomes bright with a voltage applied therebetween. Hereinafter, the substrate having TFTs and pixel electrodes formed thereon will be referred to as a TFT substrate; and the substrate having color filters and a common electrode formed thereon as a CF substrate.

FIG. 1 is a sectional view showing the structure of a typical TN liquid crystal panel; and FIG. 2 a plan view showing the TFT substrate of the same. FIG. 1 specifically shows a section taken on line I—I of FIG. 2.

The TN liquid crystal panel comprises: a TFT substrate 10; a CF substrate 20; and liquid crystal 29 sealed in between these TFT and CF substrates 10 and 20.

The TFT substrate 10 is formed in the following process. That is, on a glass substrate 11, a plurality of gate bus lines 12a and a plurality of auxiliary capacitor bus lines 12b are formed to constitute a first wiring layer. Each gate bus line 12a is formed in parallel to another. Between the gate bus lines 12a, an auxiliary capacitor bus line 12b is disposed in parallel thereto.

A first insulating film (gate insulating film, not shown) is formed on these gate and auxiliary capacitor bus lines 12a and 12b. On the first insulating film on the gate bus line 12a, an amorphous silicon film 13 is formed to become a channel of a TFT 15. To constitute a second wiring layer on the first insulating film, a data bus line 14a, and source and drain electrodes 14b and 14c of the TFT 15 are formed. The data bus line 14a is formed to perpendicularly intersect the gate bus line 12a, and the source and drain electrodes 14b and 14c are formed to be separated from each other in both sides of the width direction of the amorphous silicon film 13. The drain electrode 14c is connected to the data bus line 14a. A rectangular region partitioned by the gate bus lines 12a and the data bus lines 14a is a pixel region.

A second insulating film 16 is formed on the data bus line 14a and the source and drain electrodes 14b and 14c. On the second insulating film 16, a transparent pixel electrode 17 made of Indium-Tin Oxide (ITO) is formed. This pixel electrode 17 is electrically connected to the source electrode 14b through a contact hole 16a formed in the second insulating film 16.

On the pixel electrode 17, an alignment film 18 is formed to decide the alignment of liquid crystal molecules. This alignment film 18 made of, e.g., polyimide, has been subjected to alignment treatment by rubbing or the like.

On the other hand, the CF substrate 20 is formed in the following process. That is, on one surface (lower surface in the drawing) of the glass substrate 21, a black matrix 22 made of a light shielding material such as chromium (Cr) is formed to shield a region between pixels and TFTs forming region from lights. In a position opposite to each pixel electrode 17 of the TFT substrate 10, a color filter 23 of one selected from red (R), green (G) and blue (B) is formed. In the described example, color filters 23 of green (G), blue (B) and red (R) are alternately disposed in pixels arrayed in a lateral direction, while color filters of identical colors are disposed in pixels arrayed in a longitudinal direction.

Under the color filters 23, a common electrode 24 made of ITO is formed, and there is an alignment film 25 made of, e.g., polyimide, under this common electrode 24. This alignment film 25 has also been subjected to alignment treatment by rubbing or the like.

Between the TFT substrate 10 and the CF substrate 20, for example spherical or columnar spacers (not shown) uniform in diameter are disposed such that a spacing between these substrates can be kept constant. In addition, polarizing plates (not shown) are respectively disposed on the lower side of the TFT substrate 10 and on the upper side of the CF substrate 20.

In the liquid crystal panel constructed in the foregoing manner, a desired image can be displayed by supplying scanning and video signals from a driving circuit to the gate and data bus lines 12a and 14a at a predetermined timing, and by controlling a voltage between the pixel electrode 17 and the common electrode 24 for each pixel.

In the manufacturing process of a liquid crystal panel, patterning may not be executed correctly because of the sticking of dust or the like, causing short-circuiting or disconnection. Consequently, a pixel may be placed in a constantly lit or unlit state. Usually, in the liquid crystal panel, the presence of dot defects amounting to a predetermined number or smaller is permitted. But when the number is too large, the liquid crystal panel becomes a defective product. In addition, when a plurality of pixel electrodes are connected together, a so-called killer defect occurs, making the liquid crystal panel defective alone.

As regards a method for correcting a dot defect, the prior art has presented a method for welding and joining the electrode of a defective pixel to the gate bus line, the auxiliary capacitor bus line or the data bus line by laser irradiation. When the electrode of the defective pixel is connected to the gate bus line or the auxiliary capacitor bus line, the defective pixel is constantly unlit. Consequently, for example, for white displaying or half-tone displaying, the defective pixel becomes a dark spot to be conspicuous. When the electrode of the defective pixel and the data bus line are connected to each other, any defects cannot be recognized if the same color is displayed on the full surface of a screen. However, when displaying is carried out with the upper half of the screen set white and the lower half thereof set black, if there is a defective pixel in the black portion, it becomes a bright luminescent spot, making a defect conspicuous.

As another method for correcting a dot defect, the prior art has presented a method for disturbing the alignment of liquid crystal molecules by irradiating the entire region of the defective pixel with a laser beam. In this case, a pixel, of which alignment has been disturbed by laser irradiation, is fixed to be black. Thus, as in the case of the connection of the defective pixel electrode to the gate bus line or the auxiliary capacitor bus line, a drawback is inherent, that is, the defective pixel becomes a dark spot in white displaying or half-tone displaying to be conspicuous.

SUMMARY OF THE INVENTION

It is an object of the present invention to provide a defect correcting method for a liquid crystal panel, which is capable of preventing a defective pixel, when it occurs, from becoming conspicuous for normal use.

In accordance with an aspect of the present invention, there is provided a defect correcting method for a liquid crystal panel including a plurality of connected pixels, comprising the steps of: electrically cutting off other pixels among the plurality of connected pixels excluding a predetermined pixel from a signal supply line; and driving the other pixels by a signal supplied to the predetermined pixel.

Heretofore, a liquid crystal panel has been put aside as a defective product if a defect of an electrical connection among a plurality of pixels occurs. However, by reducing the number of connections, defective products can be saved.

According to the present invention, when a plurality of pixels are connected, electrical disconnection is made between other pixels excluding a predetermined one among the connected pixels and a signal supply line (data bus line or gate bus line). Accordingly, the plurality of connected pixels are driven by a signal supplied to one pixel. As a result, the number of apparent connections can be reduced by one and, when the number of connections is small, it is not necessary to put aside the panel as a defective product.

When a plurality of adjacent pixels are driven by a signal supplied to one pixel, the other pixels should preferably be driven by a signal supplied to a pixel having a color filter of a high transmittance. This is for the reason that when the plurality of pixels are simultaneously lit, the lighting of a pixel having a low transmittance is inconspicuous, and it is accordingly difficult to recognize a defect.

In accordance with another aspect of the present invention, there is provided a defect correcting method for a liquid crystal panel, comprising the step of: electrically connecting a pixel electrode of a pixel, where a defect has occurred, to a pixel electrode of a pixel having a color filter of a highest light transmittance among adjacent pixels having color filters different in color from the pixel.

According to the present invention, the electrode of a pixel, where a defect has occurred, is electrically connected to that of an adjacent pixel, and the defective pixel is driven simultaneously with the adjacent pixel. In this case, if connection is made to a pixel having a light transmittance lower than that of the pixel having the defect, because of the simultaneous lighting of the two pixels, the defective pixel becomes more conspicuous than a normal pixel. To prevent such an inconvenience, it is necessary to connect the pixel electrode of the defective pixel to that of a pixel having a color filter of a highest light transmittance, among adjacent pixels having color filters different in color from the defective pixel.

In accordance with yet another aspect of the present invention, there is provided a defect correcting method for a liquid crystal panel, comprising the step of: electrically connecting a pixel electrode of a pixel, where a defect has occurred, to a pixel electrode of an adjacent pixel having a color filter identical in color to the defective pixel. Thus, the defect can be made to be inconspicuous.

Furthermore, it is preferable to provide the liquid crystal panel with a correcting wiring beforehand to electrically connect the pixel electrodes of adjacent pixels to each other. Such a correcting wiring is formed on the same wiring layer as that for, e.g., a gate bus line or a data bus line, over pixel regions adjacent to each other.

DESCRIPTION OF THE PREFERRED EMBODIMENTS

Next, preferred embodiments of the present invention will be described with reference to the accompanying drawings.

(First Embodiment)

Figure 1:
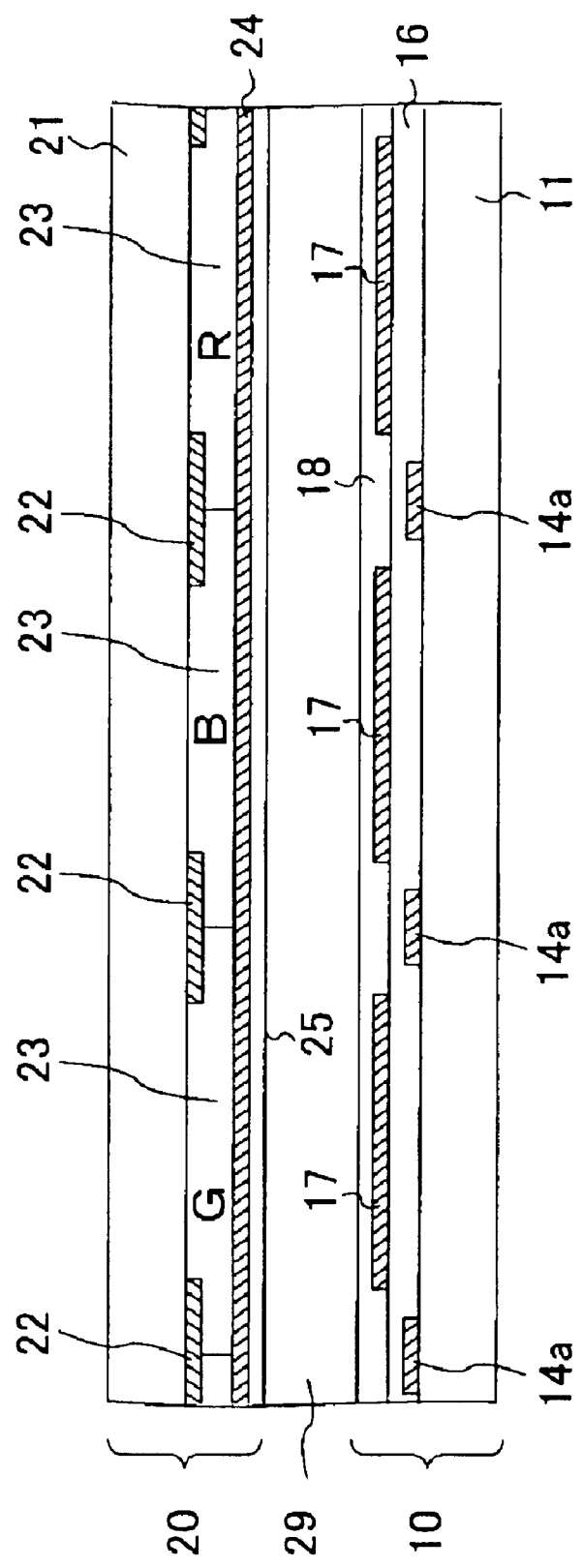
FIG. 1 is a sectional view showing a structure of a typical TN liquid crystal panel.
Figure 2:
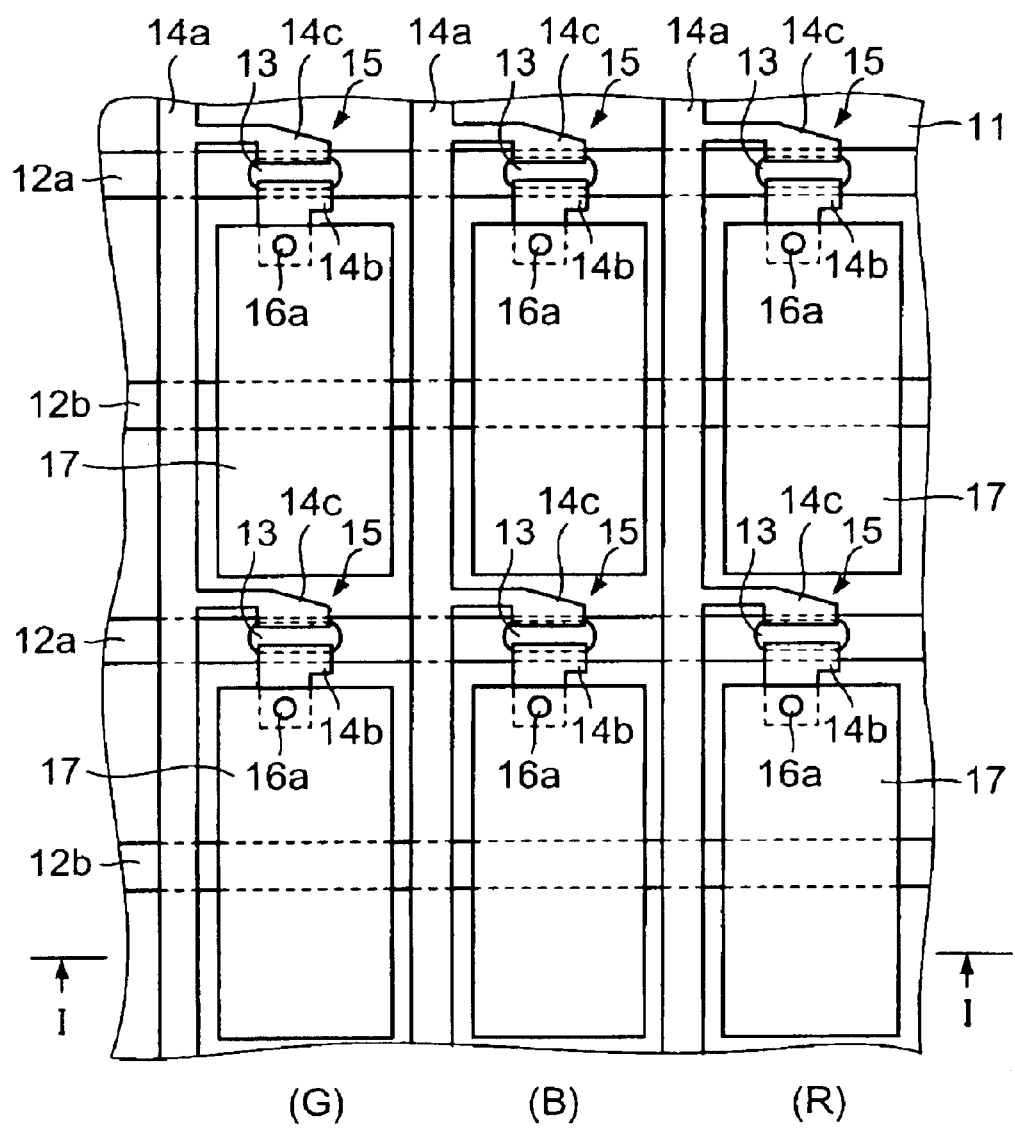
FIG. 2 is a plan view of a TFT substrate of the TN liquid crystal panel of FIG. 1.
Figure 3:
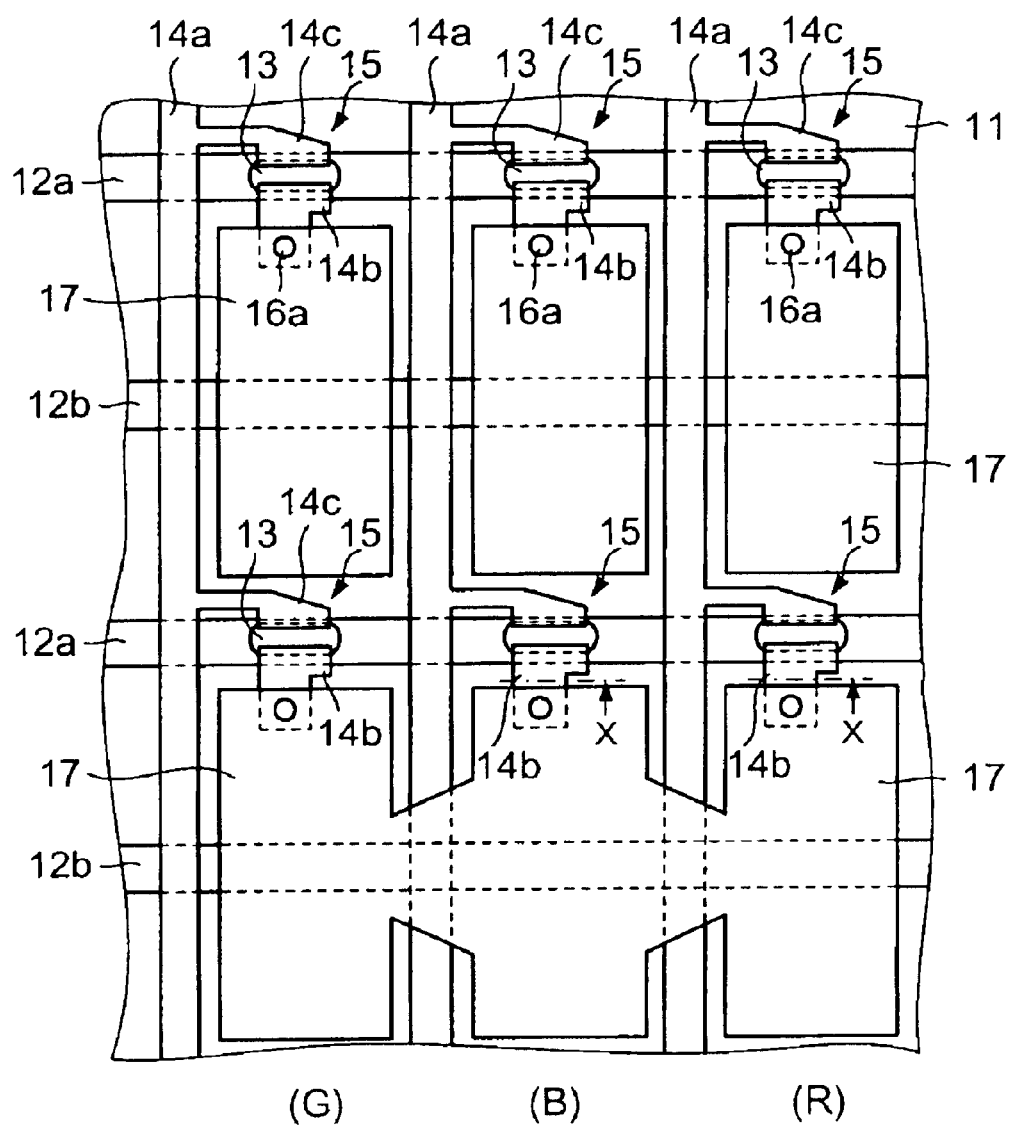
FIG. 3 is a plan view showing a defect correcting method for a liquid crystal panel according to a first embodiment of the present invention.

FIG. 3 is a plan view showing a defect correcting method for a liquid crystal panel according to a first embodiment of the present invention. The shown correcting method of the described embodiment is applied when a plurality of pixel electrodes are defectively connected in the manufacturing process of a TFT substrate. In FIG. 3, the same components as those in FIG. 2 are denoted by the same reference numerals.

As shown in FIG. 3, when a plurality of pixel electrodes 17 are connected, according to the first embodiment, the TFT of a pixel having a color filter with a highest light transmittance is used to drive the other pixels. In the example, the pixel electrodes 17 of three pixels, i.e., green (G), blue (B) and red (RED) pixels, are connected. A light transmittance varies depending on a material, a thickness and the like of a color filter. Generally, however, green has a highest light transmittance, and transmittances are lower in the order of red and blue. For example, the present inventors measured transmittances for the respective colors, and the results were that the green color filter had a luminous transmittance of 61%, the red color filter a luminous transmittance of 25%, and the blue color filter a luminous transmittance of 21%.

Thus, according to the first embodiment, the other pixels are driven by the TFT of the green pixel. In other words, a connecting portion (portion of a chain line indicated by X in the drawing) between each of the pixel electrodes 17 of the blue and red pixels and the TFT 15 is electrically cut off by laser.

In the described embodiment, when green, blue and red pixels are connected, a portion between each of the pixel electrodes 17 of the blue and red pixels and the data bus line 14a is electrically cut off. In this example, disconnection is made from the source electrode 14b of the TFT 15 of each of the blue and red pixels. Accordingly, the blue and red pixels are driven by the TFT 15 of the green pixel. Thus, when a monochromatic, i.e., white, black or gray, image is displayed, it is impossible to recognize a defective pixel.

When blue is displayed on the full screen, a single blue dark spot appears in a defective pixel portion. When red is displayed on the full screen, a single red dark spot appears in a defective pixel portion. When green is displayed on the full screen, a luminescent spot connecting two colors of blue and red appears in a defective portion. In this case, however, because of a higher luminous transmittance of green compared with blue and red, the level of the connected luminescent spot is low, making the defective portion difficult to be conspicuous.

As described above, according to the first embodiment, when the pixel electrodes are defectively connected, since the TFT of one of the pixels is used to drive the other pixels, the number of connections resulting in connection defects can be reduced substantially by one. Accordingly, when the number of connections is small, it is possible to save the liquid crystal panel where a defect has occurred. In addition, since the connected pixels are driven by the TFT of the green pixel, a defect is not so conspicuous in normal displaying except for the case where red or blue is displayed on the full screen.

In the foregoing example, the connecting method was applied when the green, blue and red pixels were connected. However, when the green pixel is connected to the blue or red pixel, the other pixels should preferably be driven by the TFT of the green pixel. When the blue pixel is connected to the red pixel, the blue pixel should preferably be driven by the TFT of the red pixel.

(Second Embodiment)

Figure 4:
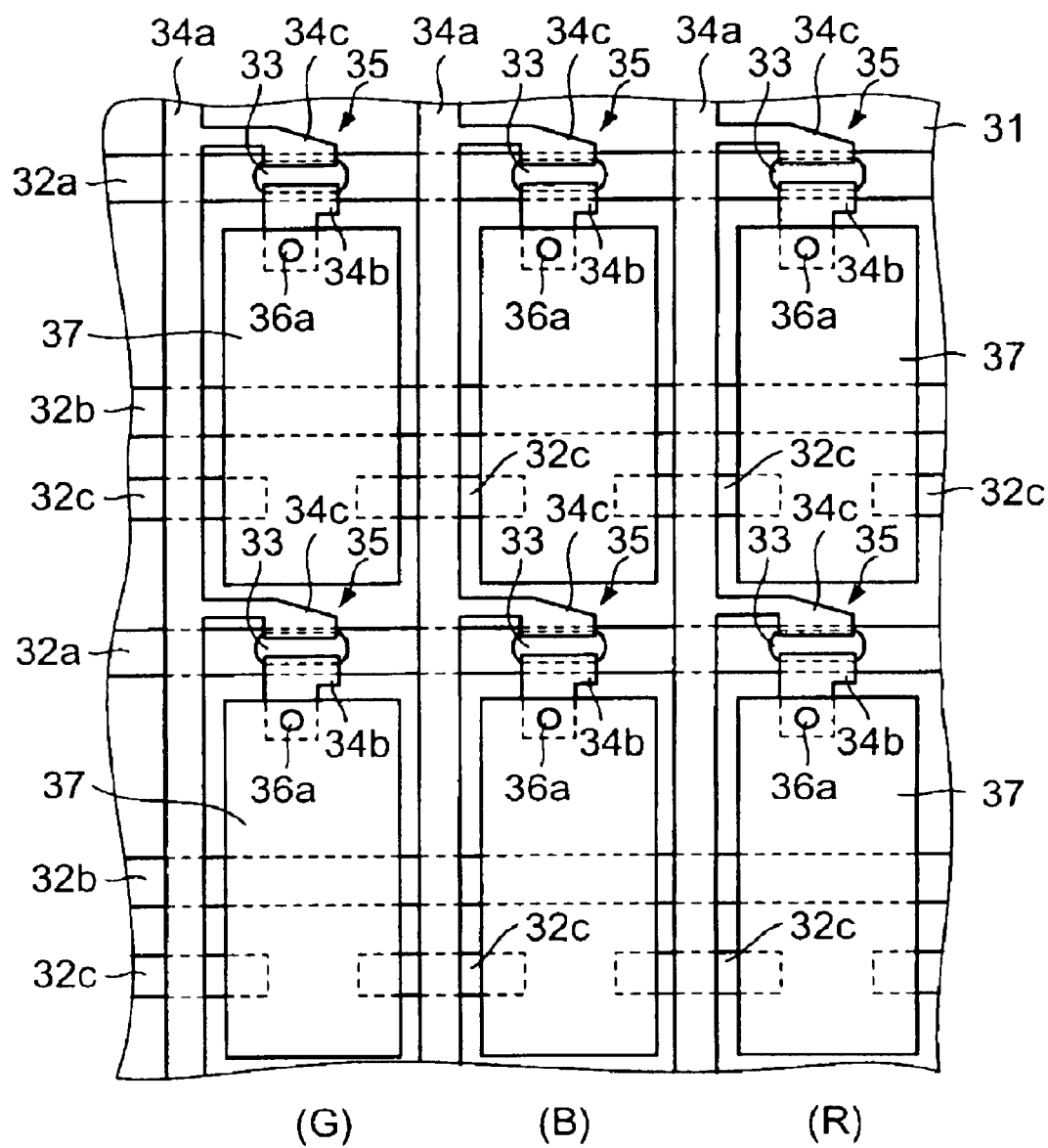
FIG. 4 is a plan view showing a TFT substrate of a liquid crystal panel according to a second embodiment of the present invention.

FIG. 4 is a plan view showing a TFT substrate of a liquid crystal panel according to a second embodiment of the present invention. In the embodiment, the structure of a CF substrate is basically similar to that of a conventional case, and thus illustration and description thereof will be omitted.

On a glass substrate (transparent plate material) 31, a plurality of gate bus lines 32a, a plurality of auxiliary capacitor bus lines 32b and a plurality of correcting wirings 32c are formed to constitute a first wiring layer. Each of the gate bus lines 32a is formed in parallel to another and, between the gate bus lines 32a, an auxiliary capacitor bus line 32b is disposed in parallel thereto. Each correcting wiring 32c is formed over two pixel regions adjacent to each other in a lateral direction.

A first insulating film (not shown) is formed on the gate and auxiliary capacitor bus lines 32a and 32b and the correcting wirings 32c. On the first insulating film on the gate bus line 32a, an amorphous silicon film 33 is formed to become a channel of a TFT 35. Also, on the first insulating film, a data bus line 34a, and source and drain electrodes 34b and 34c of the TFT 35 are formed to constitute a second wiring layer. The data bus line 34a is formed to perpendicularly intersect the gate bus line 32a, while the source and drain electrodes 34b and 34c are formed to be separated from each other in both sides of the width direction of the amorphous silicon film 33. In addition, the drain electrode 34c is connected to the data bus line 34a.

A second insulating film (not shown) is formed on the data bus line 34a and the source and drain electrodes 34b and 34c. On the second insulating film, a transparent pixel electrode 37 made of ITO is formed for each pixel. This pixel electrode 37 is electrically connected to the source electrode 34b through a contact hole 36a formed in the second insulating film.

On the pixel electrode 37, an alignment film (not shown) is formed to decide the alignment of liquid crystal molecules. This alignment film made of, e.g., polyimide has been subjected to alignment treatment by rubbing or the like.

The TFT substrate of the liquid crystal panel of the described embodiment is constructed in the following manner. That is, the correcting wiring 32c is formed over two pixel regions adjacent to each other in a lateral direction. This correcting wiring 32c is formed on the same wiring layer as that of the gate bus line 32a and the auxiliary capacitor bus line 32b. In a state before correction, the correcting wiring 32c is electrically separated from the pixel electrode 37, the gate bus line 32a, the auxiliary capacitor bus line 32b, the data bus line 34a and the like.

Figure 5:
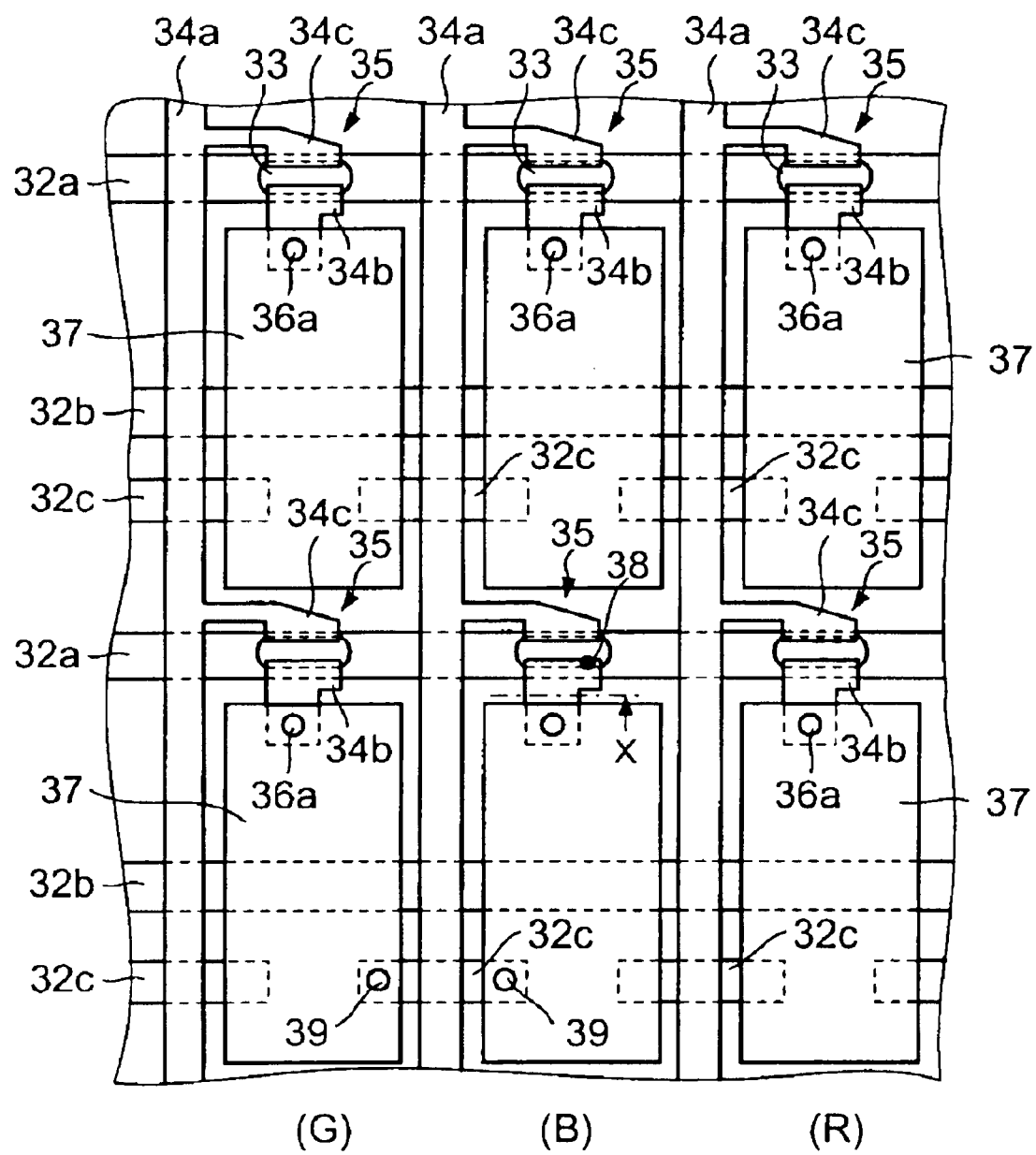
FIG. 5 is a plan view showing a defect correcting method for the liquid crystal panel of the second embodiment of the present invention.

Next, a defect correcting method for a liquid crystal panel of the second embodiment will be described. According to the embodiment, inspection is made on the presence of a defect in the inspection process of the TFT substrate and, when a defect is discovered, the defect is corrected in the following manner. It is assumed, as shown in FIG. 5, that short-circuiting occurs between the source and gate of one blue pixel (B) because of a foreign object 38 penetrating the insulating film. In this case, this pixel becomes a dot defect, which is always a dark spot, unless any correction is made thereto.

In the second embodiment, correction is carried out by using the correcting wiring 32c for connecting the blue pixel (B) having the defect and a green pixel (G) adjacent to the blue pixel (B). Specifically, as shown in FIG. 5, the pixel electrode 37 of the blue pixel (B) where the defect has occurred is welded and joined to the correcting wiring 32c by laser irradiation. The green pixel and the correcting wiring 32c are also welded and joined to each other by laser irradiation. Thus, the pixel electrode of the blue pixel having the defect is electrically connected to the pixel electrode of the green pixel adjacent thereto. The portion of connecting (connecting portion) the correcting wiring 32c to each of the blue and green pixels by laser irradiation is denoted by a reference numeral 39. Then, a connecting portion (portion of a chain line indicated by an arrow X in the drawing) between the pixel electrode 37 of the blue pixel having the defect and the TFT 35 is electrically cut off by laser. Accordingly, the defect correction is completed.

In the second embodiment, since the blue pixel having the defect is driven by the TFT of the adjacent green pixel, the defect cannot be recognized when white, black or gray (monochrome) is displayed on the full screen. When blue is displayed on the full screen, a single dark spot defect of the blue pixel appears. When red is displayed on the full screen, the defect cannot be recognized. In addition, a blue luminescent spot defect appears when green is displayed on the full screen. But since green has higher luminous sensitivity than blue, it is next to impossible to recognize the defect.

As described above, according to the second embodiment, even when a defect occurs, the level of the defect is reduced, making it possible to use the liquid crystal panel without any substantial recognition of the defect.

In Patent Application Publication (KOKAI) Hei 5-5902 discloses a liquid crystal panel including a wiring for electrically connecting two pixel electrodes when a defect occurs. In this gazette, however, no definite criterion is presented to decide an adjacent pixel to be connected to a defective pixel. For example, when a defect occurs in the blue pixel as shown in FIG. 5, the connection of the pixel electrode of the blue pixel to that of the red pixel results in the conspicuous appearance of a blue luminescent spot in the case of red displaying on the full screen. This is due to the fact that a luminous transmittance of the red color filter is substantially equal to that of the blue color filter. Accordingly, as specified in the described embodiment, when the pixel electrode of a pixel having a defect is connected to that of an adjacent pixel having a different color filter, connection must be made to the pixel electrode of one having a color filter of a highest light transmittance among adjacent pixels.

(Third Embodiment)

Figure 6:
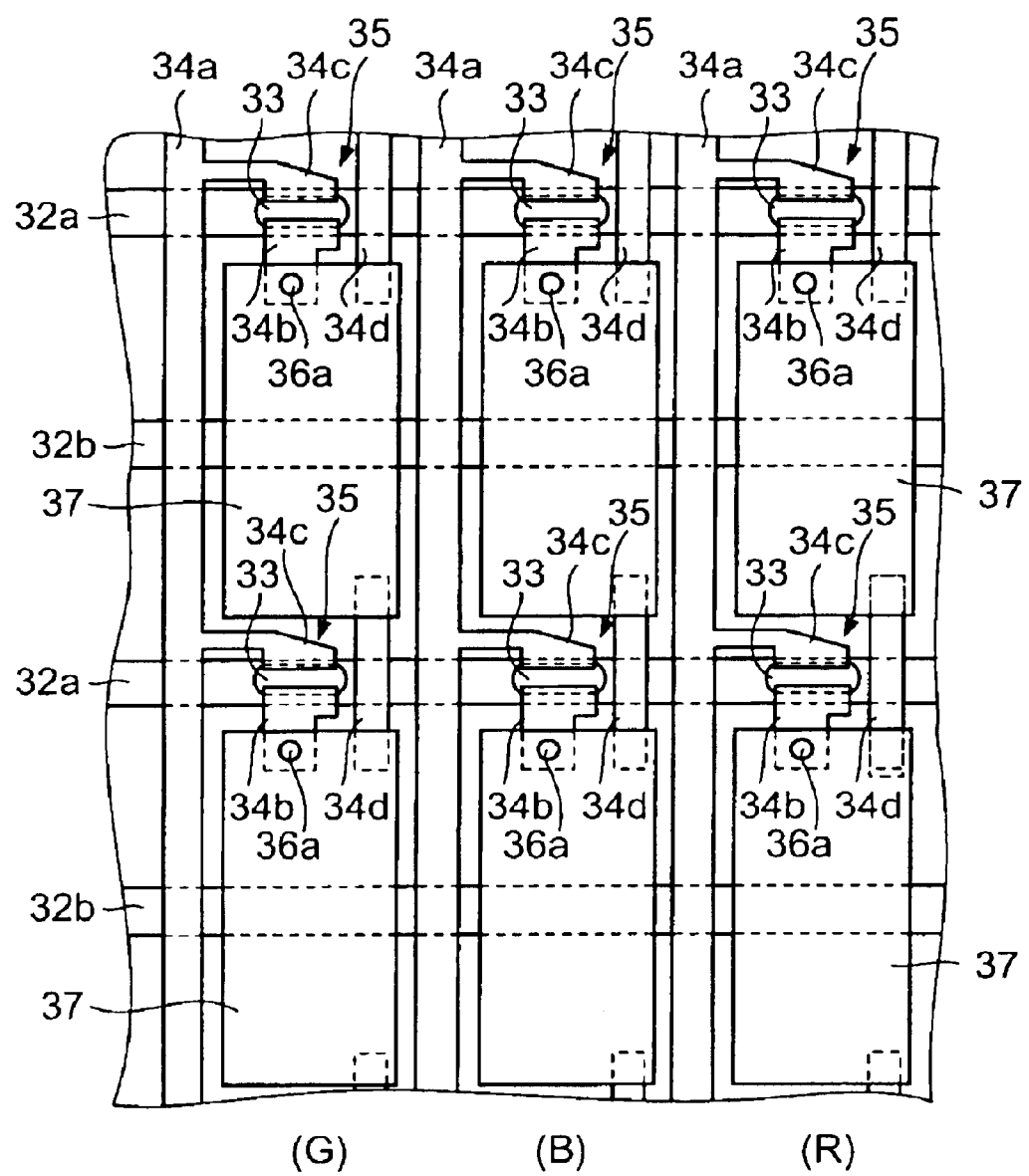
FIG. 6 is a plan view showing a TFT substrate of a liquid crystal panel according to a third embodiment of the present invention.

FIG. 6 is a plan view showing a TFT substrate of a liquid crystal panel according to a third embodiment of the present invention. Also in this embodiment, since the structure of a CF substrate is basically similar to that of the conventional case, illustration and description thereof will be omitted. In FIG. 6, the same components as those in FIG. 4 are denoted by the same reference numerals.

On a glass substrate 31, gate bus lines 32a and auxiliary capacitor bus lines 32b are formed to constitute a first wiring layer. A first insulating film (not shown) is formed on these gate and auxiliary capacitor bus lines 32a and 32b. On the first insulating film, an amorphous silicon film 33 is selectively formed to become a channel of a TFT 35. In addition, on the first insulating film, a data bus line 34a, source and drain electrodes 34b and 34c of the TFT 35, and a correcting wiring 34d are formed to constitute a second wiring layer. The correcting wiring 34d is formed over two pixel regions adjacent to each other in a longitudinal direction.

A second insulating film (not shown) is formed on the data bus lines 34a, the source and drain electrodes 34b and 34c and the correcting wirings 34d. Transparent pixel electrodes 37 made of ITO are formed on the second insulating film. This pixel electrode 37 is electrically connected to the source electrode 34b through a contact hole 36a formed in the second insulating film.

A TFT substrate of the liquid crystal panel of the third embodiment is constructed in the foregoing manner, and the correcting wiring 34d is formed over the two pixel regions adjacent to each other in the longitudinal direction. Then, the correcting wiring 34d is formed on the same wiring layer as that for the data bus line 34a and the source and drain electrodes 34b and 34c. In a state before correction, the correcting wiring 34d is electrically separated from the pixel electrode 37, the gate bus line 32a, the auxiliary capacitor bus line 32b, the data bus line 34a and the like.

Figure 7:
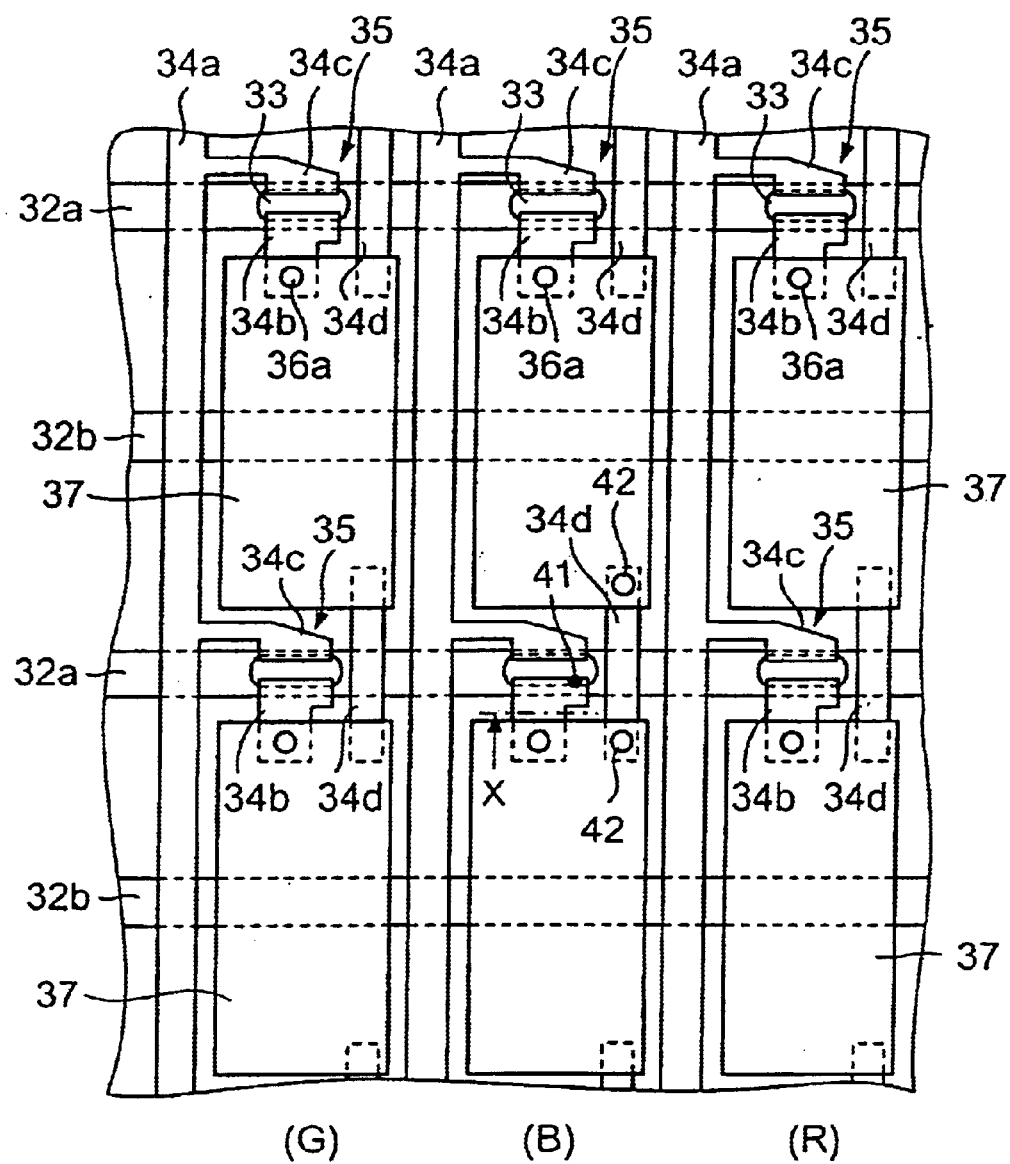
FIG. 7 is a plan view showing a defect correcting method for the liquid crystal panel of the third embodiment of the present invention.

Next, a defect correcting method for a liquid crystal display panel of the third embodiment will be described. According to the third embodiment, inspection is made on the presence of a defect in the inspection process of the TFT substrate. If a defect is found, then the defect is corrected by the following method. It is assumed, as shown in FIG. 7, that short-circuiting occurs between the source and the drain of one blue pixel (B) by a foreign object 41 penetrating the insulating film. In this case, this pixel becomes a dot defect, which is always a dark spot, unless any correction is made thereto.

In the third embodiment, correction is carried out by using the correcting wiring 34d for connecting the blue pixel (B) having the defect to a blue pixel adjacent thereto in a longitudinal direction. Specifically, as shown in FIG. 7, the pixel electrode 37 of the blue pixel (B) having the defect is welded and joined to the correcting wiring 34d by laser irradiation, the pixel electrode 37 of the adjacent pixel is welded and joined to the correcting wiring 34d by laser irradiation, and thus the pixel electrode 37 of the blue pixel having the defect is electrically connected to that of the adjacent blue pixel. The portion of connecting the correcting wiring 34d and the blue pixel to each other by laser irradiation is denoted by a reference numeral 42. Then, a connecting portion (portion of a chain line indicated by an arrow X in the drawing) between the pixel electrode 37 of the blue pixel having the defect and the TFT 35 is electrically cut off by laser. Thus, the defect correction is completed.

In the third embodiment, the blue pixel having the defect is driven by the TFT of the blue pixel adjacent thereto in the longitudinal direction. Consequently, when white, black or gray (monochrome) is displayed on the full screen, and when any one of red, blue and green colors is displayed on the full screen, a defect cannot be recognized. The defect is recognized in a special pattern such as bright and dark inversion for each dot, but compared with the case of no correction, defects are reduced.

The preferred embodiments of the present invention have been described by exemplifying the TN liquid crystal panel. It should be understood, however, that the present invention is not limited to such a TN liquid crystal panel and a correcting method therefor. In addition to the TN liquid crystal panel, the present invention can be applied to Multi-domain Vertically Aligned (MVA) and In-Plane Switching (IPS) liquid crystal panels, and others.

Furthermore, in each of the second and third embodiments, description has been made for the case where the correcting wiring is formed on the same wiring layer as that for the gate bus line or the drain bus line. However, the present invention is not limited to such, and for example silicon may be used to form the correcting wiring. In such a case, the correcting wiring can be formed simultaneously with the silicon film (channel layer or ohmic contact layer) of the TFT.

What is claimed is:

1. A defect correcting method for a liquid crystal panel including a plurality of connected pixels, comprising the steps of:

electrically cutting off other pixels among the plurality of connected pixels excluding a predetermined pixel from a signal supply line; and driving the other pixels by a signal supplied to the predetermined pixel, wherein said predetermined pixel is one having a color filter of a highest light transmittance among the plurality of connected pixels.

2. A defect correcting method for a liquid crystal panel, comprising the step of:

electrically connecting a pixel electrode of a pixel, where a defect has occurred, to a pixel electrode of an adjacent pixel, wherein the pixel electrode of said pixel having the defect is connected to a pixel electrode of a pixel having a color filter of a highest light transmittance among adjacent pixels having color filters different in color from said pixel.

* * * * *